United States Patent [19]

Hughey

[11] 4,187,878
[45] Feb. 12, 1980

[54] VALVE HAVING INTERNALLY PRESSURIZED SEALING ELEMENTS

[75] Inventor: John E. Hughey, Birmingham, Ala.

[73] Assignee: Zurn Industries, Inc., Birmingham, Ala.

[21] Appl. No.: 863,803

[22] Filed: Dec. 23, 1977

[51] Int. Cl.$^2$ .............................................. F16K 1/22
[52] U.S. Cl. ................................ 137/601; 137/246.22
[58] Field of Search ........................... 137/246.22, 601; 98/110, 121 A; 49/91, 92

[56] References Cited

U.S. PATENT DOCUMENTS

| | | | |
|---|---|---|---|
| 3,426,507 | 2/1969 | Kossowski | 98/110 X |
| 3,749,115 | 7/1973 | Raftis | 137/246.22 |
| 4,077,432 | 3/1978 | Herr | 137/246.22 X |

Primary Examiner—Robert G. Nilson
Attorney, Agent, or Firm—Jennings, Carter & Thompson

[57] ABSTRACT

Disclosed is a valve especially adapted for the control of gases in large cross sectional ducts, flues, chimneys and the like. The valve comprises a plurality of elongated, vane-like closures which, when in closed position not only substantially stop the flow of gas in the duct, etc., with which it is associated, but also form a closed chamber extending across the duct. Outside gas such as atmospheric air under pressure greater than the pressure of the gas being controlled is introduced into the closed chamber formed by the closures, thereby precluding leakage of the controlled gas past the valve. Further, when open, and due to their construction, the controlled gas flows through portions of the closures, thus reducing flow losses in the duct.

5 Claims, 7 Drawing Figures

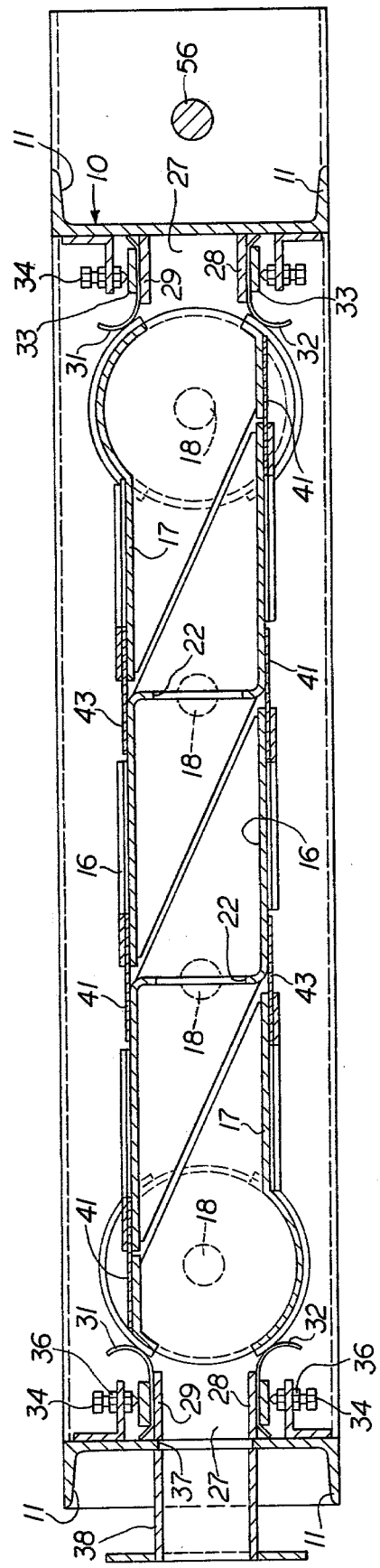
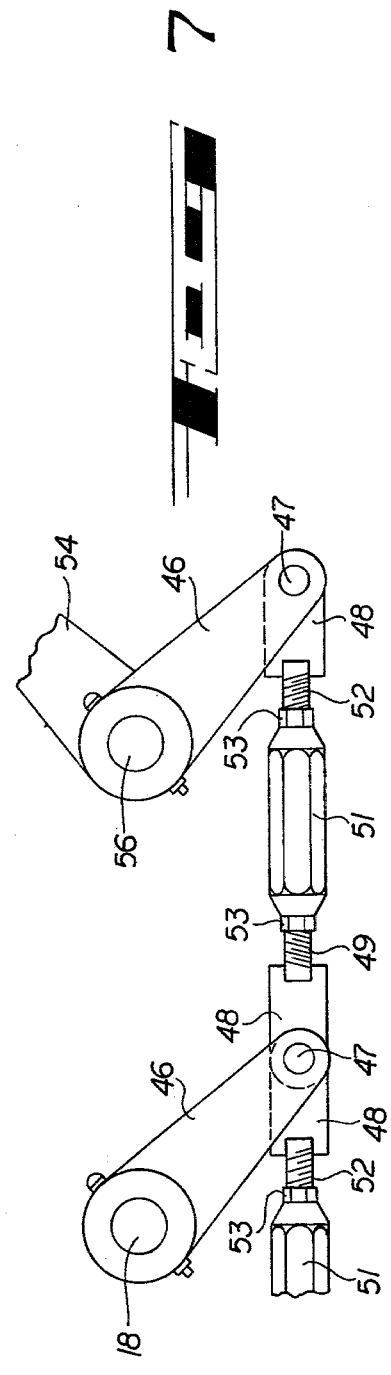

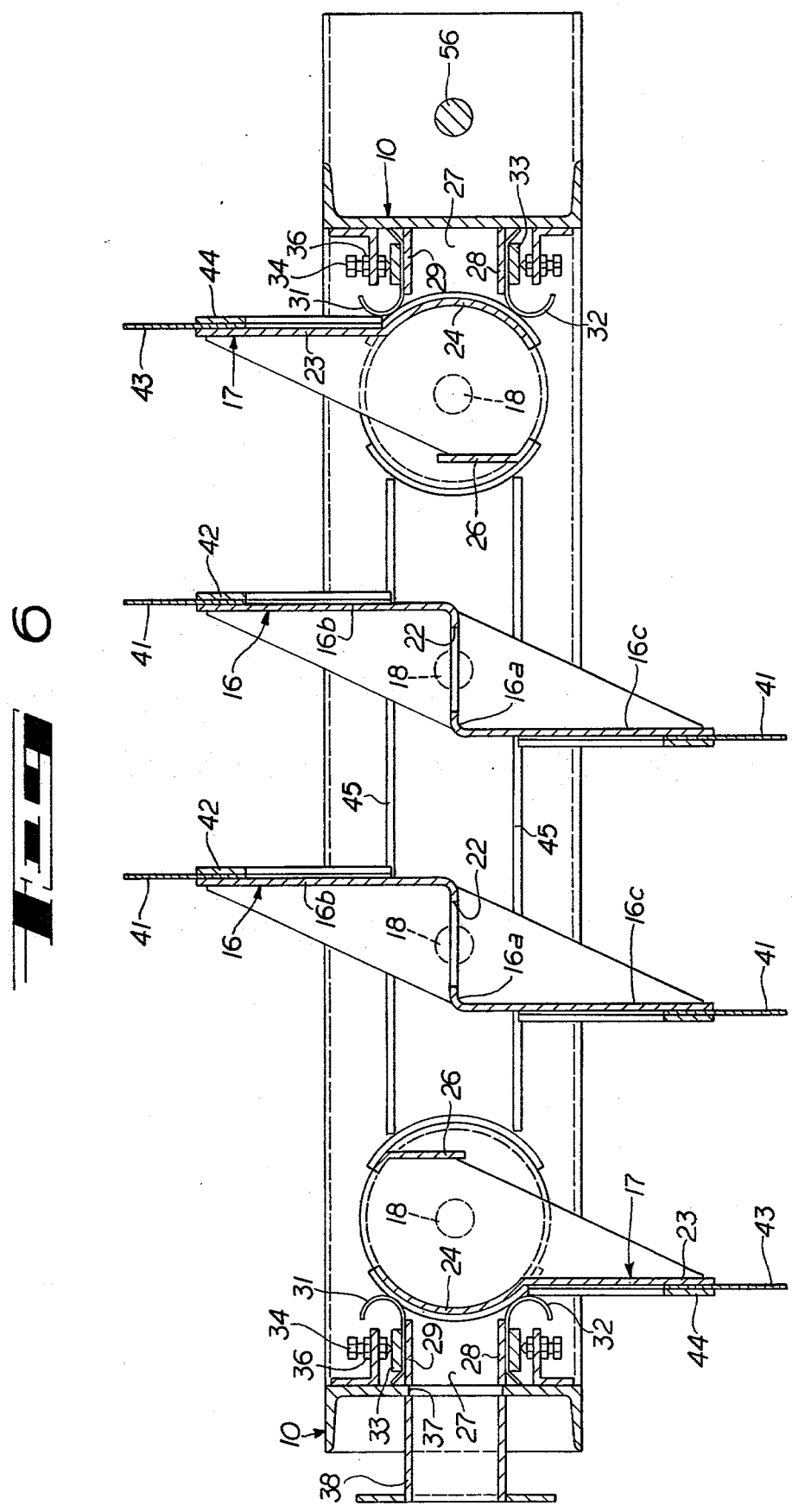

VALVE HAVING INTERNALLY PRESSURIZED SEALING ELEMENTS

BACKGROUND OF THE INVENTION

This invention relates to valves and more particularly to valves for controlling the flow of gases in large ducts, flues, chimneys and the like.

An object of my invention is to provide a valve of the character designated which comprises a plurality of cooperating closure members which, when the valve is closed cooperate to form a closed space extending across the duct, thereby not only controlling the flow of gas in the duct, but also affording a chamber into which gas under pressure greater than that of the gas being controlled may be introduced, thus to assure zero leakage of the controlled gas past or around the closure members.

Another object is to provide a valve in which the end movable members thereof, when open, automatically seal or close the opening through which external air is introduced into the closures when the latter are closed, thereby eliminating the need for a separate valve for controlling such flow into the chambers formed by the members.

Another object is to provide a valve for controlling the flow of fluids such as gases in large ducts and the like which, when in open position, offers minimum resistance to the flow in the duct.

Other objects of my invention are to provide a valve in which some of the closure members are essentially Z-shaped in cross section, the legs of the Z-shaped sections carrying flexible seal members, the connecting legs of the Z-shapes having holes therein, together with other closure members, the parts being so arranged that when closed the entire assembly forms a hollow, sealing closure for the duct, together with means to introduce fluid under pressure into the hollow sealing closure at a pressure greater than that of the controlled fluid.

Another object is to provide a valve of the character designated which is self-cleaning in that high velocity pressurized air is blown over the sealing surfaces automatically during closing of the valve, cleaning the sealing surfaces, resulting in better sealing of the valve.

DESCRIPTION OF THE DRAWINGS

A valve illustrating features of my invention is shown in the accompanying drawings forming a part of this application in which:

FIG. 5 is an enlarged detail sectional view taken generally along line 5—5 of FIG. 3;

FIG. 6 is an enlarged sectional view taken generally along line 6—6 of FIG. 4; and, FIG. 7 is a detail view of the part of the valve operating and adjusting mechanism.

DETAILED DESCRIPTION

Figure 1:
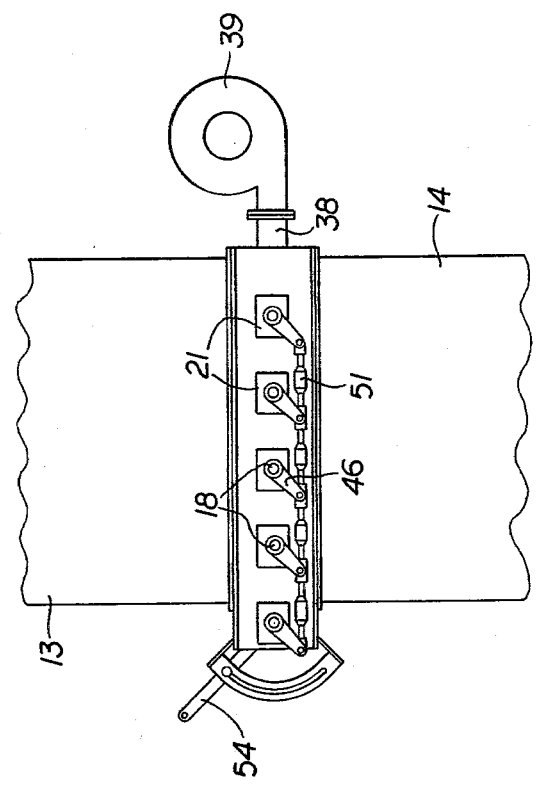
FIG. 1 is a side elevational view from one side showing the valve installed in a vertical flue.
Figure 2:
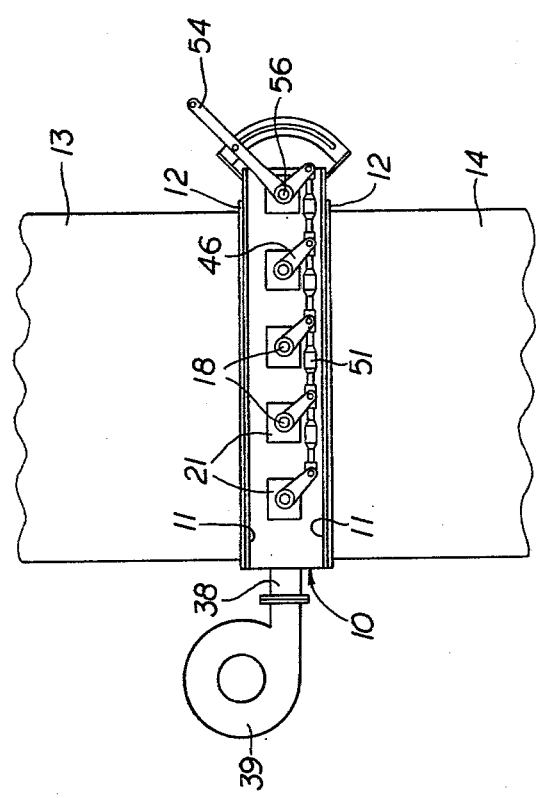
FIG. 2 is a side elevational view from the opposite side from the side shown in FIG. 1.

Referring now to the drawings for a better understanding of my invention I show the same as incorporating a centrally open, peripherally extending frame 10. The frame 10 may have flanges 11 adapted to cooperate with flanges 12 carried by duct sections 13 and 14. It will be understood that my improved valve may be made in either relatively large or relatively small sizes, but it is particularly adapted to the control of ducts of large cross section, for instance a duct 10 feet by 20 feet.

As shown particularly in FIGS. 5 and 6, the frame 10 may be formed of channels suitably welded together to provide the internally open frame to be associated with the duct sections. Mounted in the frame in a fashion to be described more in detail later are intermediate Z-shaped closure members 16 and end closure members indicated generally by the numeral 17.

Figure 3:
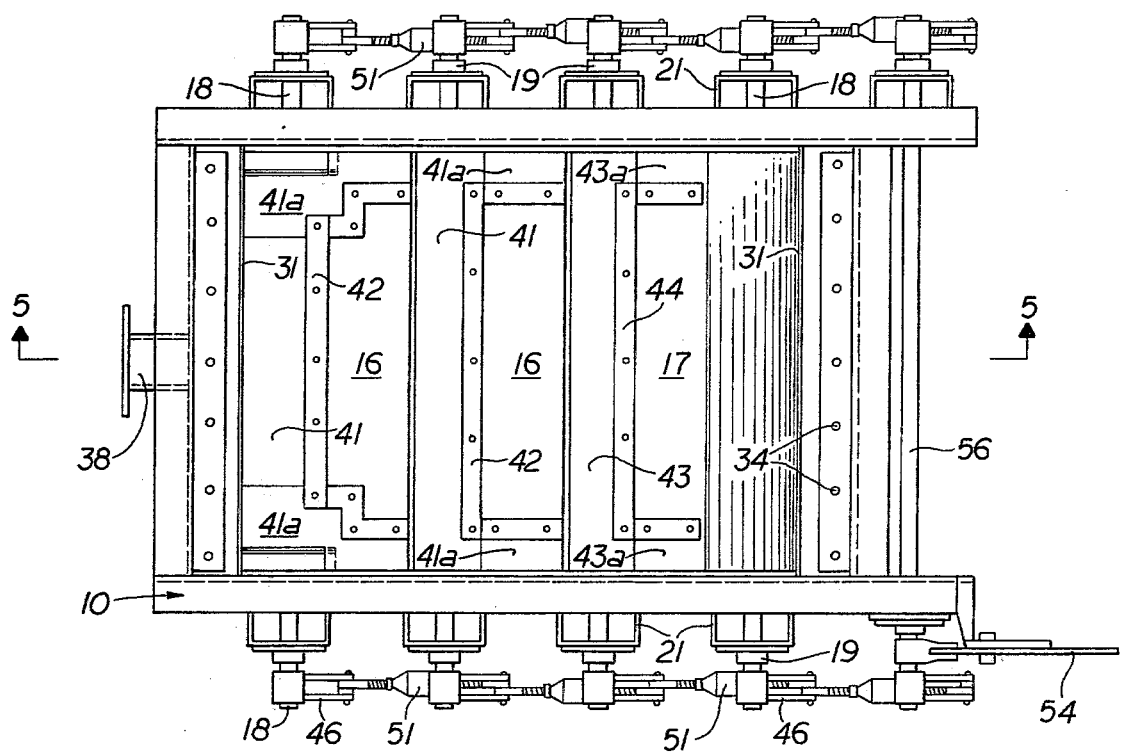
FIG. 3 is a plan view to a larger scale than FIGS. 1 and 2 and showing the valve in closed position.
Figure 4:
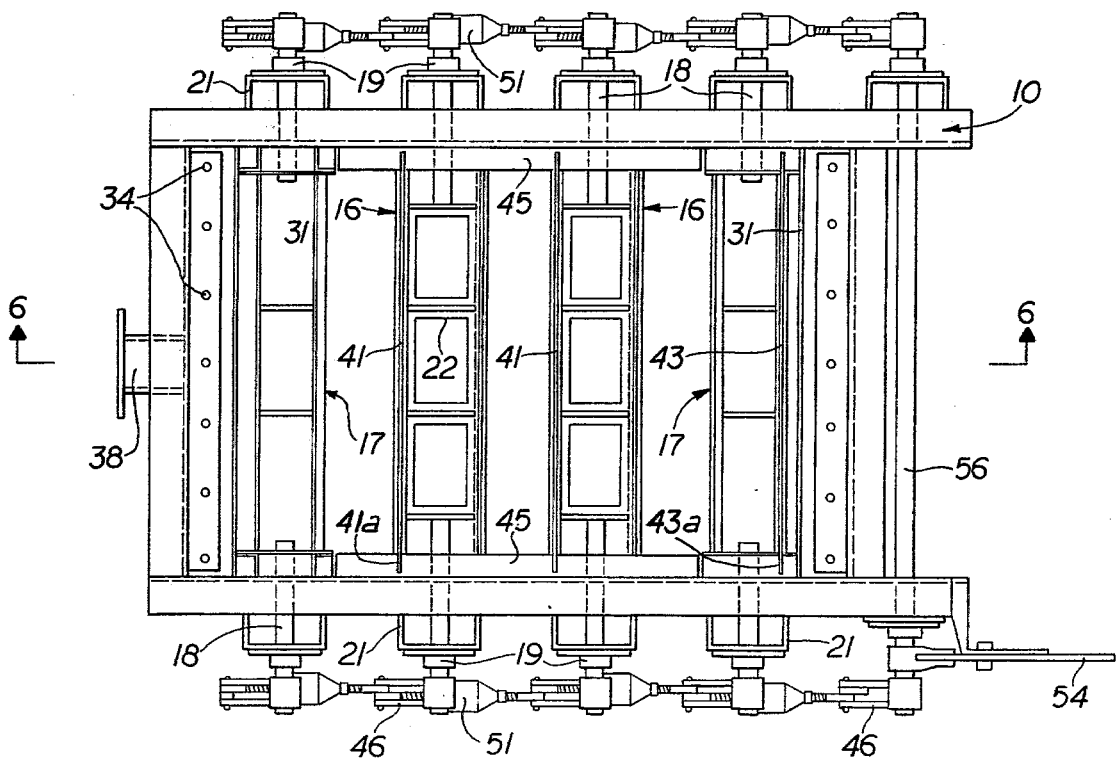
FIG. 4 is a view corresponding to FIG. 5 with the valve in open position.

More in detail, the closure members extend across the frame 11 and are pivotally mounted on stub shafts 18 so that they are free to pivot from the closed position shown in FIGS. 3 and 5 to the open position shown in FIGS. 4 and 6. The shafts 18 are journalled in bearings 19 mounted outboard of the frame in supporting brackets 21 secured to the sides of the framework 10. The shafts 18 may be mounted in stuffing boxes, not shown.

Referring again particularly to FIGS. 5 and 6 it will be seen that the intermediate members 16 are provided with openings 22 in the connecting legs 16a thereof.

End closure members 17 are provided with sealing legs 23. At their inner or pivoted ends the members 17 are provided with arcuate plate sections 24 and diametrically opposite the sections 24 are flat sections 26.

Adjacent the arcuate sections 24 of the end members 17 I provide on the inside of the frame an elongated chamber 27 defined by a pair of plates 28 and 29. Secured to these plates are flexible seal members 31 and 32, suitably held to the plates by means of bars 33 in turn held by means of screws 34 and lock nuts 36. When the valve is in the open position as for instance as in FIG. 6, the sealing members 31 and 32 are in sealing contact with the arcuate sections 24 of the end closures 17.

One of the frame members 10 may be provided with an opening 37 which affords access into one of the chambers 27. Associated with the opening is an inlet conduit 38 to which there may be supplied outside air under pressure greater than the gas being controlled, by any suitable means, such for instance as blower indicated diagrammatically at 39.

The legs 16b and 16c of each of the Z-shaped members 16 carry flexible seals 41. These seals are held in place by means of suitable strips 42. In similar manner the closure members 17 carry flexible seals 43 held in place on the legs 23 by means of strips 44.

Another feature of my invention is the method of simultaneously operating the several closure members together with means to adjust the same. To this end I provide on each of the shafts 18 an arm 46. As best shown in FIG. 7 the lower ends of the arms 46 are pivotally connected by means of a pin 47 to a link member 48 carried on the end of one of the threaded members 49 of a turnbuckle indicated generally by the numeral 51. The opposite and oppositely threaded member 52 of the turnbuckle carries a similar member 48. The usual lock nuts 43 are provided for the turnbuckle. It will thus be seen that the angularity of the arms 46 and hence their respective shafts relative to each other may be adjusted by means of the turnbuckles.

The entire series of closure units may be operated in unison by means of a handle 54 secured to a shaft 56 extending across the frame. I preferably provide the arms 46 on each of the shafts 18 at each end of the valve assembly so as to eliminate any likelihood of undue twisting of the closure members. Suffice it to say that when the handle 54 is moved from the position of FIG. 1 downwardly, all of the closure members move in unison.

From what has been described it will be seen that with the parts in the closed position, FIGS. 3 and 5, the intermediate Z-shaped closure members 16 and the end members 17 lie generally in common planes, transversely of the opening to be controlled. In this position air under pressure admitted through the conduit 38 pressurizes the chamber formed by the several closed closure members, assuring zero passage of controlled gas through or around the valve. It will be understood that the respective sealing members 41 and 43 carried by the closures cooperate as shown to seal against the adjacent closures. In both positions, namely in the open and closed positions, the seals 31 and 32 maintain sealing relation with respect to the arcuate or curved sections of the end members 17. Therefore, the air space 27 is maintained "closed" at all times, eliminating the necessity of having to shut off the air supply to that chamber.

The ends of the members 16 and 17 are sealed by means of seal extension members 41a and 43a. These extensions contact inwardly projecting, upper and lower flanges 45 carried by the valve frame 10.

It will also be noted that when the valve is almost closed air from blower 39 is being delivered to the "inside" of the several closure members. This causes a blast of air to pass over the several sealing surfaces, namely, those surfaces where the seals 41 and 43 cooperate with the adjacent closure members, thus to clean these surfaces and thereby prevent leakage of air due to contamination.

In view of the foregoing it will be seen that I have devised an improved, economical and positively operating valve or damper for controlling the flow of fluids such as gases. My invention is characterized by its simplicity, and further by the fact that when in open position the openings 22 through the base legs of the Z-shaped members 16 also permit the flow of the control fluid, reducing stack losses occasioned by the presence of the valve in the system.

While I have shown my invention in but one form, it will be obvious to those skilled in the art that it is not so limited but is susceptible of various changes and modifications without departing from the spirit thereof.

What I claim is:

1. In a valve,
   (a) a plurality of plate-like closure elements generally Z-shaped in cross section and of a size substantially to span an opening in an enclosure containing fluid under pressure different from atmospheric pressure,
   (b) means mounting the closure elements for movement from sealing position with the legs of the Z-shapes thereof substantially normal to the flow path of the fluid being controlled to open position with the legs of the Z-shapes thereof substantially parallel to said flow path,
   (c) said closure elements being constructed and relatively arranged when closed to form a continuous chamber substantially spanning said opening, and
   (d) means to maintain the chamber formed by the closure elements under pressure greater than the pressure of fluid being controlled.

2. Apparatus as defined in claim 1 in which the means to maintain the closure elements when in closed position under pressure greater than the fluid being controlled comprises a fluid passage leading to an endmost one of the closure elements, there being an opening in the end of said endmost closure element adjacent the inner end of said fluid passage, and means to effect a seal between the end of the fluid passage and the chamber formed by the closed closure elements.

3. A valve as defined in claim 2 in which the end of the closure element cooperable with said seal is configured to permit the closure element to pivot adjacent said end from open to closed position, and vice versa, whereby when the closure element is in closed position fluid from said passage is delivered thereinto and when open the inner, seal carrying end of the fluid passage is closed.

4. For use in association with at least one other similar unit to form a valve for controlling fluid in a conduit,
   (a) an elongated vane-like closure member Z-shaped in cross section and having an opening in the connecting leg of said Z-shape,
   (b) means disposed to mount the closure member for movement from a sealing position with the connecting leg of the Z-shape parallel to the flow path of the fluid to be controlled to an open position with said leg of the closure member disposed generally normal to the flow path of said fluid, whereby in said open position some of the fluid flows through the opening in the connecting leg of the closure, and
   (c) means to move the closure from closed to open position and vice versa.

5. In a valve for controlling the flow of fluid in a conduit, which fluid is under pressure different than atmospheric pressure,
   (a) a housing disposed for fluid flow connection with the conduit,
   (b) a plurality of open sided, elongated, vane-like closure elements disposed collectively to close the conduit and when closed to form a chamber extending across the housing,
   (c) seals on the adjacent cooperating sides of the elements effective when the elements are in conduit closing position to prevent major leakage of fluid between the same,
   (d) means adjacent each end of the elements mounting them for axial pivotal movement from fluid sealing positions to open valve positions effective to permit the controlled fluid to flow transversely of the closure elements,
   (e) means to supply fluid under pressure greater than that of the controlled fluid to the chamber formed when the closure elements are in closed positions, and
   (f) means to substantially simultaneously apply axial pivotal forces to both ends of said closure members, and means between each of the members at each of said ends to adjust the angular positions of each of the pivotally mounted closure elements relative to each other.

* * * * *